Figure 1:
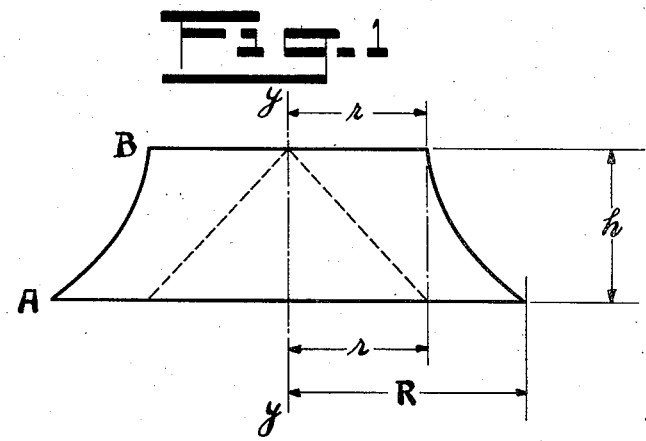

Nov. 7, 1944.  E. H. COLLICUTT  2,362,355

AIR MIXER

Filed July 12, 1941  2 Sheets-Sheet 1

INVENTOR.
Earl H. Collicutt
BY William Pelzer
ATTORNEY

Nov. 7, 1944.  E. H. COLLICUTT  2,362,355
AIR MIXER
Filed July 12, 1941  2 Sheets-Sheet 2
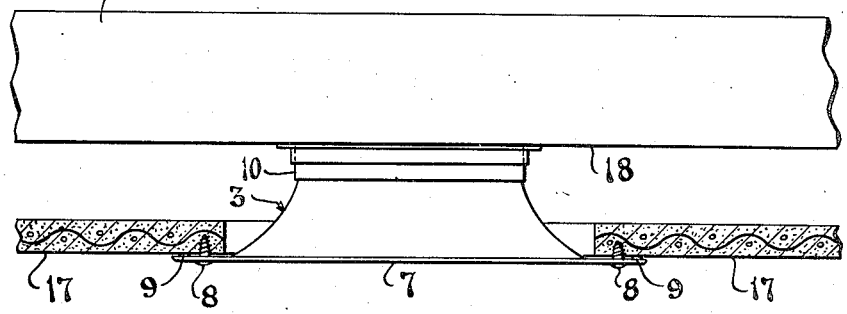
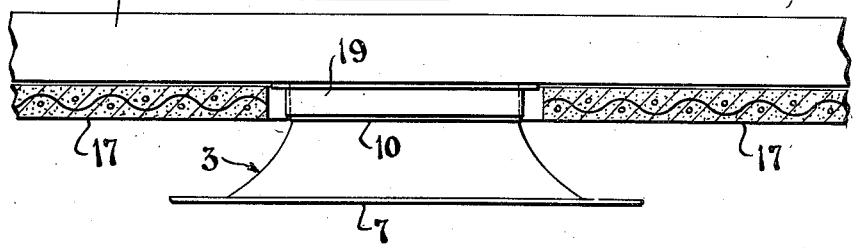
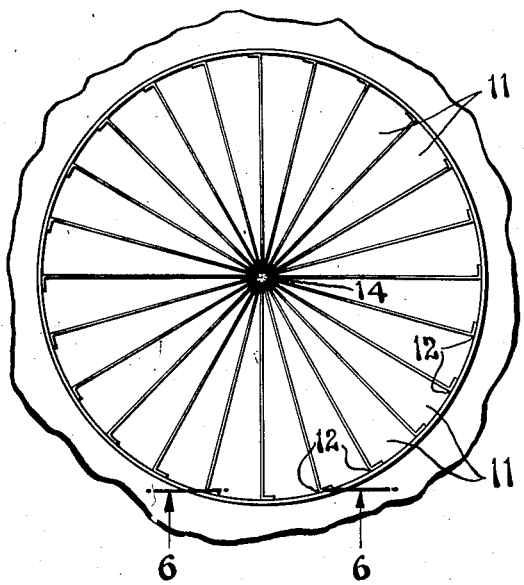
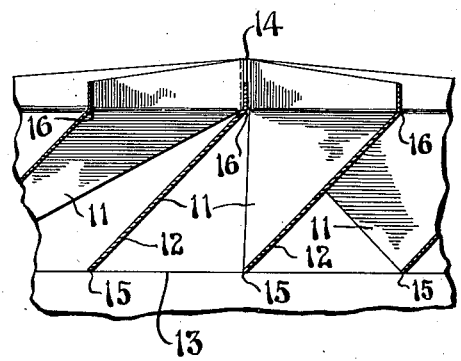
INVENTOR.
Earl H. Collicutt
BY William Pelzer
ATTORNEY Patented Nov. 7, 1944

2,362,355

UNITED STATES PATENT OFFICE 2,362,355

AIR MIXER

Earl H. Collicutt, New York, N. Y.

Application July 12, 1941, Serial No. 402,091

7 Claims. (Cl. 98—40)

This invention relates to ventilating systems in which fresh air from the exterior of a building or from an air conditioning plant within a building is mixed with the air of a room, and the main object is to provide a simple method for causing the fresh air which is conveyed to a room to draw the room air outward of the room into a chamber where the room air mixes with fresh air and the mixed or re-conditioned air is ejected into the room at an angle away from the axial center of such chamber.

A further object of the invention is to provide a method and fixture in the form of a chamber through which the fresh air is conveyed to a room and within which the fresh air is caused to move in a circular direction away from the axis of the chamber thereby creating a low pressure area axially within the chamber causing an inward suction or aspiration of room air into the chamber and effect a mixing of the room air so drawn into the chamber with the fresh air within the chamber and from which chamber the mixed air is driven into the room by the incoming fresh air from the supply duct.

A further object of the invention is to provide an apparatus or fixture for discharging fresh air from a supply duct into a room in a manner to effect air distribution uniformly in all directions, or in any desired direction, at an angle to the axis of the outlet and thereby create inward aspiration of the room air into the chamber of the fixture and cause mixing of the room air and fresh air within the chamber and ejection of the mixed air at an angle from the axis of the outlet and thereby provide continuous withdrawal of room air into the chamber and continuous mixing with fresh air.

A further object is to provide a fixture having a chamber in which the incoming fresh air from the supply duct is caused to flow with a circular centrifugal movement within the chamber and creating a whirling air current which speads out in all directions as it is impelled from the chamber and in doing so creates a low pressure area axially of the chamber and inward aspiration of the room air into the chamber which is caught in the whirling current of fresh air and mixed therewith within the chamber and the mixed air is impelled from the chamber by such whirling action.

And a further object is to provide a fixture for this purpose having no moving parts and requiring no auxiliary power to effect the mixing of fresh and room air and the distribution of such mixed air into a room, and therefore noiseless.

In my Patent No. 2,217,944, dated October 15, 1940, is shown an apparatus in which a rotary blower is employed for effecting the mixing within a chamber of room air with fresh air supplied from a duct. In the present invention the rotary blower is dispensed with, and in carrying the present invention into effect I employ a fixture in the form of a circular chamber or inverted bowl having an outwardly sloping wall and which fixture is adapted for connection at its smaller diameter to a duct supplying fresh air. At the plane of connection of this inverted bowl to the air duct is inserted a series of vanes set at an angle to the passage of the air stream whereby the velocity of the air supply will cause the air stream to be deflected at an angle toward the wall of the bowl and cause the air current to flow with a circular centrifugal movement down the slope of the bowl and to escape at the rim at an angle to the axis of the bowl. This action results in the formation of a whirling air current within and adjacent the suface of the bowl and effects a low pressure area or vacuum within and axially of the chamber and a suction or aspirating effect drawing the room air vertically into the bowl where the whirling movement of the fresh air draws the room air into the whirling stream and effects a complete mixture of the fresh air and room air all within the confines of the chamber and the whirling movement causes the mixed air to be driven out into the room in all directions at an angle to the axis of the chamber. This action causes a greater volume of air to pass out under the rim of the bowl into the room than is received from the fresh air supply duct, the volume being the sum of the fresh air driven into the bowl from the air supply duct and the aspirated room air. This volume varies with the variation in air velocity in the fresh air supply duct.

In the accompanying drawings which illustrate the invention—

Figure 1 is a diagrammatic view illustrating the mathematical development of the form of the mixing bowl.

Figure 2:
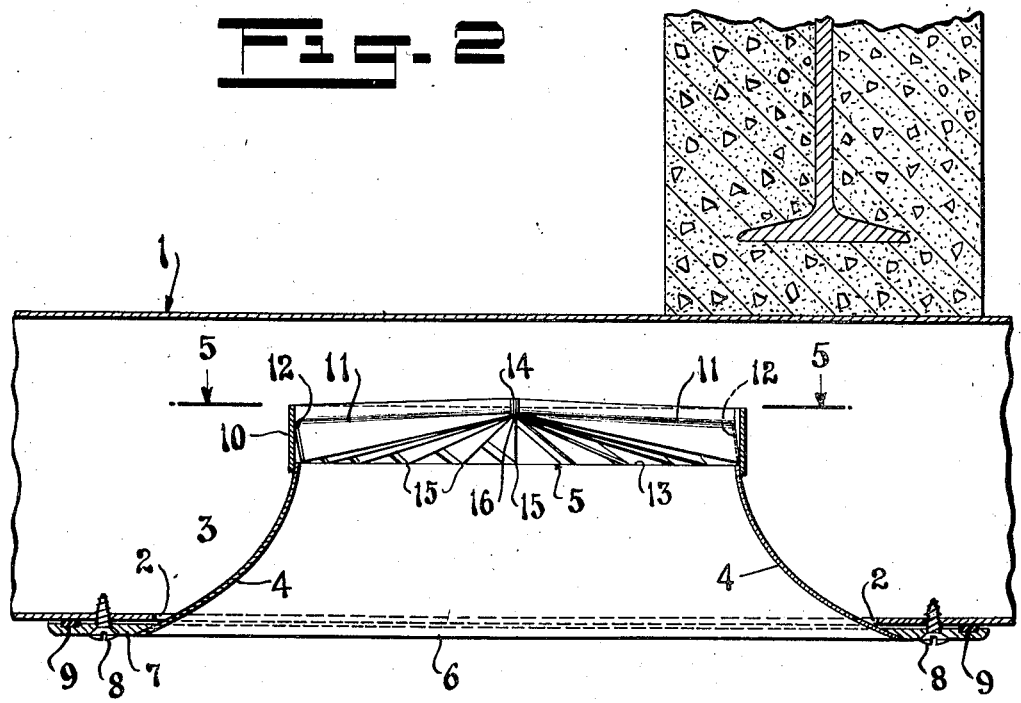

Figure 2 a schematic view showing the mixing and distributing bowl inserted into an opening in an exposed air duct with the intervening deflecting vanes carried by a ring seated upon the inner rim of the bowl and showing the outer or discharge rim of the bowl flush with the underside of the duct.

Figure 3 a similar view illustrating a concealed air duct and the distributing bowl inserted into an outlet of a room ceiling and connected into an outlet on the underside of the duct with the intervening deflecting vanes below the plane of the duct.

Figure 4 a similar view illustrating a concealed air duct with the distributing bowl connected to the duct as in Figure 3 but projecting below the plane of the room ceiling; and Figures 5 and 6 are plan and vertical sectional views, respectively, of the ring carrying the deflecting vanes.

The mathematical development of the mixing and distributing bowl to effect the desired result establishes the following premises:

(1) All cross-sectional air velocities from the top to the outlet of the bowl or chamber of the unit remain constant.

(2) The horizontal component of the tangential vector is equal to the velocity as in (1).

(3) Air is sucked into the bowl axially at the larger diameter in approximately equal quantity as is blown in at the smaller diameter from the supply duct.

(4) The velocity of the air under suction in the plane of the outlet is approximately equal to the velocities as in (1).

(5) All cross-sections in a horizontal plane are circular.

(6) Air under suction feeds proportionally from top to bottom of the bowl into the main air stream.

Referring to Figure 1 of the drawings, R is the radius at the outlet plane A of the bowl; $r$ is the radius at the inlet plane B of the bowl; $h$ is the height of the bowl; and by premise 4 $r$ is also the radius of the suction intake area at the outlet plane of the bowl. Therefore the discharge area at the outlet plane A is equal to the area defined by radius R minus the area defined by radius $r$; and by premises 3 and 1 this discharge area passes approximately twice the amount of air entering at the inlet from the fresh air supply duct.

With a constant velocity of air entering the bowl from the supply duct, the quantity passing or entering any cross-sectional area is proportional to the cross-sectional area under consideration. Therefore the air passing or discharging at the outlet plane is proportional to $$Pi \times R^2 - Pi \times r^2$$

and in turn is equal to $2Pi \times r^2$ by premises 3 and 1. Then—

$$\pi R^2 - \pi r^2 = 2\pi r^2$$
$$\pi R^2 = 3\pi r^2$$
$$R^2 = 3r^2$$
$$R = r\sqrt{3} = r1.732$$

Therefore, to determine the height $h$ of the bowl for a given slope all that is required is to equate $$\frac{1.732h}{2r}$$

to the tangent of the slope required and solve for $h$. For example, let inlet radius $r=5$, and the final slope required be 26° 35′. The tangent for this angle being 0.5004 then $$1.732h = 2 \times 5 \times 0.5004 \div 1.732 \text{ or } h = 2.89$$

In reference to a cross-sectional area of the bowl, a downward vector is determined by the resultant of the rotational velocity in the plane, and the through flow velocity at right angles to the plane. The slope of this vector is then—

$$\frac{\text{Velocity (tangential to the } r-\text{circle)}}{\text{Velocity (perpendicular to the } r-\text{circle)}} = \text{slope}$$

The average angle of rotation made before the air leaves the bowl will be—

$$\text{Slope} \times \frac{h}{\pi(R-r)} \times 360° = \text{angle of rotation}$$

Referring now to Figure 2, 1 indicates an exposed air duct carried along a ceiling or wall and having a flat underside with a circular room outlet 2 into which is inserted the inverted circular bowl shaped air mixing chamber 3. The wall of this chamber slopes outward preferably with a convex inner surface 4, the small diameter 5 being the inlet communicating with duct 1, and the large diameter 6 being the outlet to the room. The bowl is provided with a supporting ring 7 the inner diameter of which is bevelled to match the inner surface of the bowl and the ring forming a flange for securing the bowl by screws 8 to the duct as shown in Figure 2 or to the ceiling as shown in Figure 3. The flange is sealed on the duct or ceiling with a rubber gasket 9.

At the inlet of the bowl is seated a ring 10 which supports a set of angularly disposed blades on vanes 11, see Figures 5 and 6. The outer ends 12 of the vanes are preferably set at an angle of 45° to the horizontal plane 13 of the ring and each vane is secured at its broad end 12 to ring 10, and at the inner ends the vanes are bent at an angle to present a vertical end 14 for securing the vanes together at the center. It will be noted that the lower outer-edge 15, Figure 6, of each vane is in alignment with the angle 16 of the adjacent blade. The ring 10 with vanes 11 is held stationary on the bowl so that the air stream entering between the vanes is deflected both at a downward angle away from the axis of the bowl and toward its wall and also in an angular direction circumferentially of the bowl due to the angular set of the vanes and thereby creating a more or less rapid centrifugal and whirling movement of the air stream according to the velocity of the stream in the air supply duct.

This centrifugal whirling movement of the fresh air stream causes the formation of a low pressure area within and axially of the chamber as the fresh air moves in a circular path downward adjacent to the wall of the chamber and which low pressure area is of gradually increasing diameter from zero at the inlet plane B to a diameter at the outlet plane A equal to the diameter of inlet plane as indicated diagrammatically in Figure 1. This low pressure area causes suction of room air into the chamber, and this air is caught by the whirling fresh air stream and is mixed therewith while within the chamber, and the mixed air is ejected at the rim of the bowl by the rapid movement imparted to the whirling stream at a rate proportional to the velocity of the air current in the supply duct.

Thus an air current moving at the rate of approximately 500 feet per minute across the inlet of a bowl having the characteristics above outlined and an inlet diameter at plane B and outlet diameter at plane A approximately 4 and 7 inches, respectively, will emit about 75 cubic feet per minute into a room while drawing approximately 43 cubic feet per minute from the duct. Similarly a bowl having inlet and outlet diameters of approximately 8 and 14 inches, respectively, will emit at the same duct velocity about 300 cubic feet per minute while drawing approximately 175 cubic feet per minute from the duct. This excess of air emitted over the amount drawn from the duct represents approximately the amount of room air drawn into the bowl and mixed within the chamber with fresh air drawn from the duct.

In Figure 3 the same construction of mixing bowl is shown but instead of the air duct being exposed it is concealed within the ceiling or wall 17 and the bowl 3 is fitted to an outlet in the duct in which the ring 10 fits closely and flush with the bottom wall 18 of the duct, and ring 7 is secured by screws 8 to the ceiling or wall 17 and sealed thereon by gaskets 9.

In Figure 4 the same construction of mixing bowl is shown applied to a duct located close to the ceiling or wall plaster 17, and an outlet collar 19 is provided at the duct outlet into which bowl ring 10 is inserted and secured in any suitable manner. In this form the bowl 3 with its ring 7 projects below the ceiling.

What I claim is:

1. The method of re-conditioning the air of a room, which consists in conveying fresh air to a circular chamber having inlet and outlet areas at axially opposite ends and of gradually increasing circumference from the inlet area to the outlet area, imparting to the fresh air at the inlet area of the chamber a downward whirling movement along the wall of the chamber which creates within the chamber a circular air-flow of expanding diameter causing a low pressure area axially thereof, and thereby causing aspiration of room air into the low pressure area within the chamber, causing the room air so drawn into the low pressure area to be mixed within the chamber with the fresh air flow, and causing the mixed air due to the angular expanding movement of the air flow to be ejected laterally from and around the rim of the outlet plane of the chamber at a rate proportional to the velocity of the fresh air entering the inlet to the chamber.

2. The method of re-conditioning the air of a room, which consists in conveying fresh air to a circular chamber of gradually increasing diameter having inlet and outlet areas at axially opposite ends, imparting to the fresh air at the inlet area of the chamber a downward whirling movement which creates within the chamber a circular air-flow of expanding diameter having a low pressure area axially thereof of gradually increasing area from the inlet plane to the outlet plane, and thereby causing aspiration of room air into the low pressure area within the chamber in volume approximately equal to the volume of fresh air entering the chamber from a supply duct, causing the room air so drawn into the low pressure area to be mixed within the chamber with the fresh air flow, and causing the mixed air due to the angular movement of the air flow to be ejected laterally from and around the rim of the outlet plane of the chamber in volume approximately equal to double the volume of fresh air entering the chamber from the supply duct and at a rate proportional to the velocity of the fresh air entering the inlet to the chamber.

3. The method of re-conditioning the air of a room, which consists in conveying fresh air to a circular chamber of gradually increasing diameter having inlet and outlet areas at axially opposite ends, imparting to the fresh air at the inlet area of the chamber a downward whirling movement which creates within the chamber a circular air-flow having a low pressure area axially thereof, and thereby causing aspiration of room air into the low pressure area within the chamber, causing the room air so drawn into the low pressure area to be mixed within the chamber with the fresh air flow, and causing the mixed air due to the angular movement of the air flow to be ejected laterally from and around the rim of the outlet plane of the chamber at a rate proportional to the velocity of the fresh air entering the inlet to the chamber and in volume proportional to three times the square of the inlet radius and the square of the outlet radius.

4. In air conditioning apparatus, the combination with a fresh air supply duct leading to and having an outlet at a room, a mixing chamber at such outlet comprising a circular body having inlet and outlet planes at axially opposite ends, an unobstructed wall sloping outward from the inlet plane to the outlet plane, and deflecting blades fixed transversely at the inlet plane of the chamber and set radially at an angle relative to the axial center of the chamber for imparting a whirling movement to the air entering the chamber from the supply duct and whereby the air is deflected toward and down the sloping wall of the chamber.

5. An air conditioning apparatus as specified in claim 4, having the deflecting blades set at an angle of 45° to the plane of the inlet.

6. In air conditioning apparatus, the combination with a fresh air supply duct leading to and having an outlet at a room, a mixing chamber at such outlet comprising a circular body having inlet and outlet planes at axially opposite ends, an unobstructed convex inner wall gradually increasing in diameter from the inlet plane to the outlet plane, the square of the radius of the outlet plane being equal to three times the square of the radius of the inlet plane, and deflecting blades fixed transversely at the inlet plane of the chamber and set radially at an angle relative to the axial center of the chamber for imparting a whirling movement to the air entering the chamber from the supply duct and whereby the air is deflected toward and down the convex wall of the chamber.

7. An air conditioning apparatus as specified in claim 6, having the deflecting blades set at an angle of 45° to the plane of the inlet.

EARL H. COLLICUTT.